2,746,855

POTASSIC NITROPHOSPHATE FERTILIZERS AND METHOD OF PREPARING THE SAME

Samuel Ruosch, Visp, Valais, Switzerland

No Drawing. Application December 7, 1950,
Serial No. 199,714

Claims priority, application Switzerland December 9, 1949

1 Claim. (Cl. 71—39)

The invention relates to potassic nitrophosphate fertilizers.

It is known to prepare such fertilizers in granular form by incorporating potassium salts in the nitrophosphate conversion products and working up said mixtures into granules.

The addition of potassium salts, however, is liable to impart objectionable properties to the fertilizers, e. g. the softening point may be lowered, and it is necessary to maintain defined working conditions in order to obtain stable products which have a high softening point and can be readily granulated.

For instance, a known method proposed by applicant, where potassium sulphate is employed, is carried out in such a way that the potassium sulphate is added only after the decomposition of the crude phosphate has been completed and the ratio of free acid has decreased to less than 3 per cent; the amount of potassium sulphate added is so adjusted as to provide a ratio of 5 to 14 per cent of $K_2O$ in the final product. After the potassium sulphate has been added, the mass is thoroughly mixed and kneaded whereupon the hot pasty mixture is worked up to granules with cooling and solidification.

In this known method it is essential that the reaction of calcium nitrate with potassium sulphate proceeds as far as possible according to the equation $$Ca(NO_3)_2 + K_2SO_4 = 2KNO_3 + CaSO_4$$

Therefore the amount of potassium sulphate added is preferably calculated in conformance with said equation and the mass has to be thoroughly mixed and kneaded in the temperature range of 80–90° C. for a period of time up to one hour or more.

If the operating conditions set forth hereinbefore are maintained, granulated potassic nitrophosphate fertilizers can be successfully produced on a large scale, provided that potassium sulphate is employed. On the other hand, the preparation of potassic nitrophosphate fertilizers by means of potassium chloride has met with considerable difficulties, due particularly to the fact that products are obtained which have relatively low softening points and which are difficult or impossible to granulate.

A principal object of the invention is to provide a method for preparing from potassium chloride potassic nitrophosphate fertilizers which are stable and are readily obtained in strewable form.

Other objects and advantages will become apparent from a consideration of the specification and claim.

Careful investigations have shown that the softening point of nitrophosphate conversion products which contain potassium chloride depends essentially on the water content of said conversion products and on the malaxing time of the mixtures containing the potassium chloride. The lower the water content and the shorter the period of mixing and kneading, the higher is the softening point of the product. For instance, the following relations were found for a mixture containing 8.2 per cent of $K_2O$:

| Mole $H_2O$ per mole $Ca(NO_3)_2$ | Softening temperature in degrees C. |
|---|---|
| 2.2 | 67 |
| 2.5 | 47 |
| 3.0 | 43 |
| 3.3 | 42.5 |

My experiments have shown that with the use of potassium chloride products having a high softening point can be obtained only when a reaction of the potassium chloride with calcium nitrate to potassium nitrate and calcium chloride is avoided as far as possible.

This objectionable reaction is the better avoided the lower the water content of the mixture is and the less time is used for the kneading operation. The temperature has a bearing on the reaction too and it should not exceed about 65° C.

I have found that products having a sufficiently high softening point are obtained only when not more than about 25 per cent of the potassium chloride added are allowed to react with the calcium nitrate of the phosphate decomposition product to form potassium nitrate and calcium chloride.

As will be seen from the foregoing description, the working conditions for the incorporation of potassium chloride are basically different from the conditions to be maintained in the known method using potassium sulphate.

In carrying out the novel process, the phosphates may be decomposed by nitric acid in the known manner. I prefer to use dilute nitric acid of about 50 to 60 per cent. First an aqueous vesicular pasty mass is obtained, which can be dried in the vesicular state by passing therethrough a current of hot air. According to the invention, the drying operation is preferably carried out in such a way that the mass contains per 1 mole of calcium nitrate not more than 2.4 moles of water. The lower limit of the water content is about 2.0 moles of water per 1 mole of calcium nitrate. After the water content has been adjusted to the desired ratio, potassium chloride is incorporated at a temperature below 65° C. The ingredients are thoroughly mixed only for a short period of time to avoid that undesired reactions take place to an objectionable extent. In general, the mixing time should not exceed 15 minutes. The mixture may be worked up to grains or granules according to conventional procedures. Due to the high softening point of the products, they may be subjected to granulation in granulators of high capacity. In contradistinction to the known method which allows the incorporation of limited amounts only of potassium sulphate, the novel method permits of adding to the phosphatic decomposition products potassium chloride in any desired amount.

The following example is given to illustrate the method of the invention and is not to be considered as limiting the invention. All parts are given by weight.

Example 1,000 parts of Morocco phosphorite containing 33.5% of $P_2O_5$ were continuously treated with 1,520 parts of 50% $HNO_3$ and decomposed to a vesicular mass, which was dried in a current of hot air. The drying operation was so adjusted as to obtain in the porous mass a calcium nitrate with 2.4 moles of water of crystallization. The vesicular still warm nitrophosphate having a temperature of about 41° C. was continuously fed into a disintegrator and thoroughly mixed to form a thick paste. The pasty mass was then passed into a second disintegrator and potassium chloride containing 50% of K₂O was continuously worked into the nitrophosphate in a proportion of about 140 parts of potassium chloride to 860 parts of nitrophosphate. After the mass had been kneaded for about 15 minutes, it was delivered to the granulator and granulated.

The end product had a softening temperature of about 51° C. It contained 16.1% of total $P_2O_5$, 13.9% water soluble, 7.0% of nitrogen and 8.8% of $K_2O$, of which about 75 per cent were present in the form of potassium chloride and 25 per cent in the form of potassium nitrate.

If the decomposition product was still further dehydrated, for instance to 2.3 moles of water per one mole of $Ca(NO_3)_2$, a product was obtained which had a softening point of about 57° C.

The potassium chloride is incorporated into the decomposed product at a temperature at which the mass is able to swell and may be granulated well. The lower limit of temperature generally lies at about 40° C. The granulation proceeds so quickly that during the granulation the product is not subjected to undesired variation. Cooling to room-temperature takes place after granulation.

The method is very advantageous, because the cheaply mined potassium chloride may be introduced directly into the fertilizer and it is no longer necessary to convert it to potassium sulphate.

All variations and modifications of the invention described hereinabove falling within the spirit thereof are intended to be included within the scope of this invention as defined in the appended claim.

What I claim is:

A method of preparing potassic nitrophosphates comprising the steps of decomposing crude phosphates with nitric acid, dehydrating the decomposed produce containing phosphate and calcium nitrate to a water content of substantially not more than about 2.4 moles of water per 1 mole of calcium nitrate, admixing potassium chloride to said decomposed product in an amount sufficient to obtain an end product of about 5 to 14 per cent of $K_2O$, kneading said mixture at a temperature of about 40 to 65° C. for a time insufficient to react more than 25 per cent of said potassium chloride with said calcium nitrate to form calcium chloride and potassium nitrate, thereby maintaining a ratio of less than one mole of potassium nitrate for each 5 moles of calcium nitrate, and granulating the mixture.

References Cited in the file of this patent

UNITED STATES PATENTS

| | | |
|---|---|---|
| 1,950,945 | Luscher | Mar. 13, 1934 |
| 1,971,111 | Luscher et al. | Aug. 21, 1934 |

FOREIGN PATENTS

| | | |
|---|---|---|
| 294,117 | Great Britain | July 4, 1929 |
| 376,934 | Great Britain | July 21, 1932 |